(12) United States Patent
Narula et al.

(10) Patent No.: US 7,361,213 B2
(45) Date of Patent: Apr. 22, 2008

(54) BORAZINE-BORON NITRIDE HYBRID HYDROGEN STORAGE SYSTEM

(75) Inventors: Chaitanya K. Narula, Knoxville, TN (US); J. Michael Simonson, Knoxville, TN (US); Leon Maya, Knoxville, TN (US); Robert T. Paine, Albuquerque, NM (US)

(73) Assignee: UT-Battelle, LLC, Oak Ridge, TN (US)

( * ) Notice: Subject to any disclaimer, the term of this patent is extended or adjusted under 35 U.S.C. 154(b) by 404 days.

(21) Appl. No.: 11/208,816

(22) Filed: Aug. 22, 2005

(65) Prior Publication Data
US 2007/0039474 A1   Feb. 22, 2007

(51) Int. Cl.
*C01B 21/064* (2006.01)
*C01B 35/10* (2006.01)

(52) U.S. Cl. .................. 96/108; 423/285; 423/290; 502/526

(58) Field of Classification Search .............. 96/108, 96/147, 148, 151; 423/248, 276, 284, 285, 423/290, 648.1; 502/526; 206/0.7
See application file for complete search history.

(56) References Cited

U.S. PATENT DOCUMENTS

| 4,801,439 | A | 1/1989 | Blum et al. | |
|---|---|---|---|---|
| 6,348,179 | B1 | 2/2002 | Paine et al. | |
| 2005/0069488 | A1 | 3/2005 | Zhao et al. | |
| 2006/0099127 | A1* | 5/2006 | Zaluska et al. | 423/286 |
| 2006/0165577 | A1* | 7/2006 | Jhi et al. | 423/265 |
| 2006/0194695 | A1* | 8/2006 | Au | 502/400 |

OTHER PUBLICATIONS

C.A. Jaska, et al., "Transition Metal-Catalyzed Formation of Boron-Nitrogen Bonds: Catalytic Dehydrocoupling . . . ," 2003, J Am Chem Soc, pp. 9424-9434, vol. 125.
C.K. Narula, et al., "Boron-Nitrogen Polymers/Boron Nitride System for Hydrogen Storage," Mar. 2005, pp. 34-36.

* cited by examiner

*Primary Examiner*—Frank M Lawrence
(74) *Attorney, Agent, or Firm*—Joseph A. Marasco

(57) ABSTRACT

A hybrid hydrogen storage composition includes a first phase and a second phase adsorbed on the first phase, the first phase including BN for storing hydrogen by physisorption and the second phase including a borazane-borazine system for storing hydrogen in combined form as a hydride.

11 Claims, 4 Drawing Sheets

BORAZINE-BORON NITRIDE HYBRID HYDROGEN STORAGE SYSTEM

The United States Government has rights in this invention pursuant to contract No. DE-AC05-00OR22725 between the United States Department of Energy and UT-Battelle, LLC.

FIELD OF THE INVENTION

The present invention relates to systems for storing hydrogen, and more particularly to hybrid systems for storing hydrogen that use a borazine-boron nitride composite system wherein the borazine component stores hydrogen in combined form as a hydride and wherein boron nitride component stores hydrogen by physisorption.

BACKGROUND OF THE INVENTION

Hydrogen is well known as one of the cleanest of available fuels because it can be reacted with oxygen to produce energy and water in hydrogen-consuming devices such as fuel cell and internal combustion engines, for example. Virtually no other reaction byproducts are produced in the exhaust, thereby avoiding well established environmental hazards associated with the use of petroleum based fuels.

Safe and efficient storage of hydrogen is essential for hydrogen-consuming applications. In particular, important factors involved in the development of mobile hydrogen-consuming applications include minimization of volume and weight of the hydrogen storage systems, while maximizing the safety thereof.

Conventional methods of storing hydrogen are generally either inadequate or impractical for wide-spread mobile consumer applications. For example, hydrogen can be stored in liquid form at very low temperatures, but at an unacceptably low efficiency. The energy consumed in liquefying hydrogen gas is about 40% of the energy available from the resulting hydrogen. Moreover, shelf-life is very limited; an ordinary tank filled with liquid hydrogen will become empty in about a week. These factors make liquid hydrogen impractical for most consumer applications.

An alternative is to store hydrogen under high pressure in cylinders. However, a 100 pound steel cylinder can only store about one pound of hydrogen at about 2200 psi, which translates into 1% by weight of hydrogen storage.(ˆ) More expensive composite cylinders with special compressors can store hydrogen at higher pressures of about 4,500 psi to achieve a more favorable storage ratio of about 4% by weight. Although even higher pressures are possible, safety factors and the large amount of energy consumed in achieving such high pressures have compelled a search for alternative hydrogen storage technologies that are both safe and efficient.

In view of the above, there is a need for safe, efficient, effective methods and systems for storing and recovering hydrogen. In addition, there is a desire to minimize the overall system volume and weight.

OBJECTS OF THE INVENTION

Accordingly, objects of the present invention include: systems and methods that enable effective, safe, efficient storage, and controllable release of hydrogen, especially for energetic systems such as fuel cells and the like; a hydrogen storage system that provides an initial release of hydrogen for initial operation of a hydrogen-consuming process and subsequent "on-demand" release of hydrogen for ongoing operation of the hydrogen-consuming process. Further and other objects of the present invention will become apparent from the description contained herein.

SUMMARY OF THE INVENTION

In accordance with one aspect of the present invention, the foregoing and other objects are achieved by a hybrid hydrogen storage composition that includes a first phase and a second phase adsorbed on the first phase, the first phase including boron nitride for storing hydrogen by physisorption and the second phase including a borazane-borazine system for storing hydrogen in combined form as a hydride.

In accordance with another aspect of the present invention, a hydrogen storage system includes a containment vessel containing a hybrid hydrogen storage composition including a first phase and a second phase adsorbed on the first phase, the first phase comprising BN for storing hydrogen by physisorption and the second phase comprising a borazane-borazine system for storing hydrogen in combined form as a hydride.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention involves a hybrid storage system incorporating both hydrogen sorption and chemical-hydride storage media. The present invention involves a new class of composite materials comprising low-molecular weight boron-nitrogen compounds, particularly a borazane/borazane polymer system, impregnated (sorbed) into high-surface area boron nitride (BN). Hydrogen sorption media makes low-pressure hydrogen available during start-up of a vehicle while chemical-hydride media releases hydrogen "on-demand" during vehicle operation.

The borazane molecule contains 13.9 wt. % hydrogen and can release 6.9 wt. % of the hydrogen via a borazane-borazine chemical transformation. High surface area BN powders can store and release ~2 wt. % hydrogen. The hydrogen storage limits for this system are approximately 2-6.9% (0% borazane to 0% BN) at low temperatures. Since the density of borazane is 0.96±0.01 g/cm³, the volumetric hydrogen storage is not significantly different.

Borazane, $B_3N_3H_{12}$, which is the B—N analogue of cyclohexane, can undergo facile chemical hydrogenation-dehydrogenation. It is known that borazane can be prepared from hydrochlorination and sodium borohydride reduction of borazine, $B_3N_3H_6$., and that borazane reverts to borazine on heating at 200° C. However, such a system has limitations that there is no hydrogen available for start-up of vehicle and external energy is needed to initiate release of hydrogen from borazane to start the vehicles. The problem is solved by use of a borazane-impregnated BN system in accordance with the present invention, which can physisorb hydrogen and make it available for start up of the vehicle. Such a system has never before been contemplated for the storage and release of hydrogen.

Figure 1:
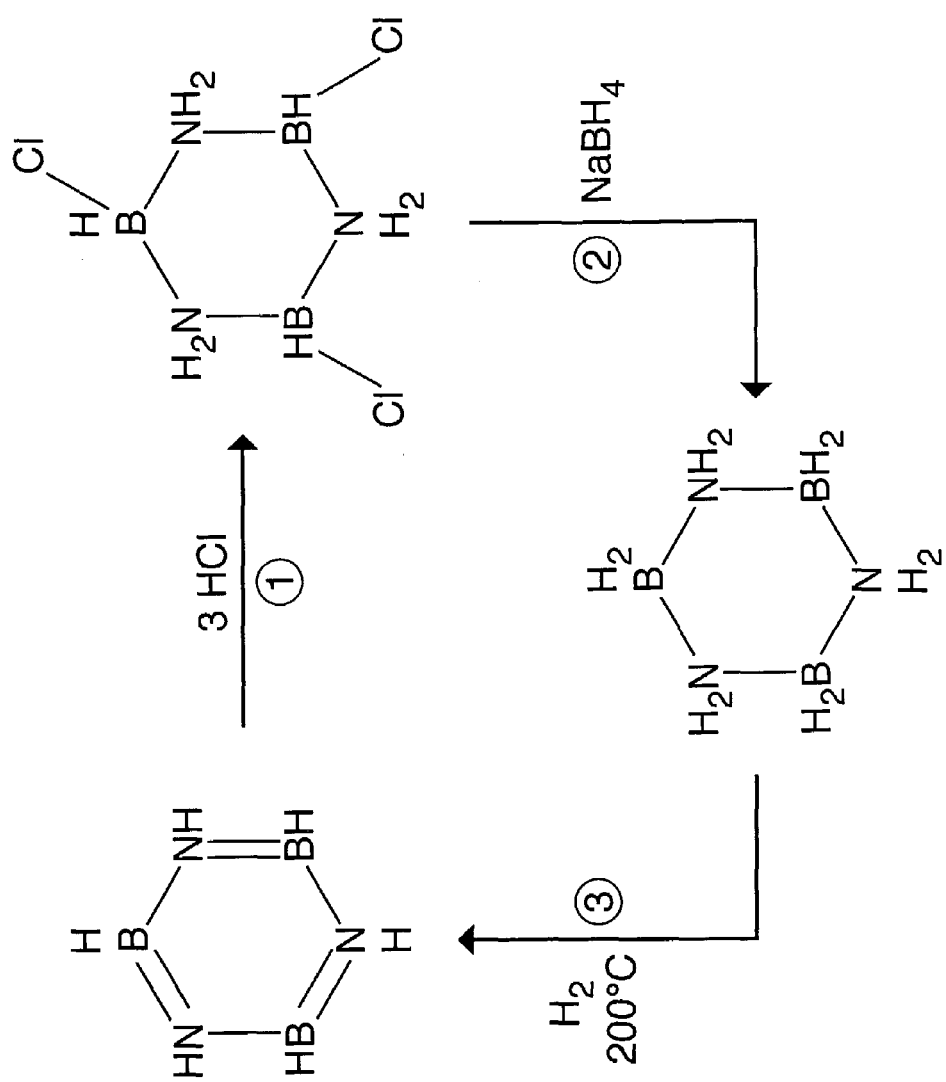
FIG. 1 is a schematic molecular diagram of a borazane-borazine cyclic system in accordance with the present invention.

Referring to FIG. 1, the hydrogenation-dehydrogenation pathway of the borazane-borazine system operates as follows:

1. Hydrochlorination of borazine to B-trichloroborazane;
2. Borohydride reduction to borazane; and
3. Thermal degradation to release hydrogen and conversion back to borazine.

Figure 2A:
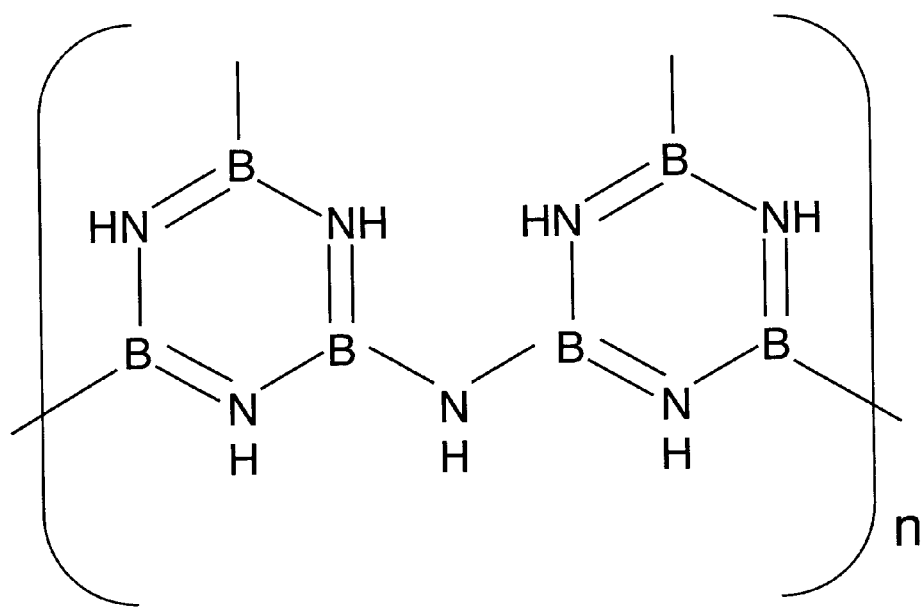
FIG. 2a is a schematic molecular diagram of a borazine polymer.
Figure 2B:
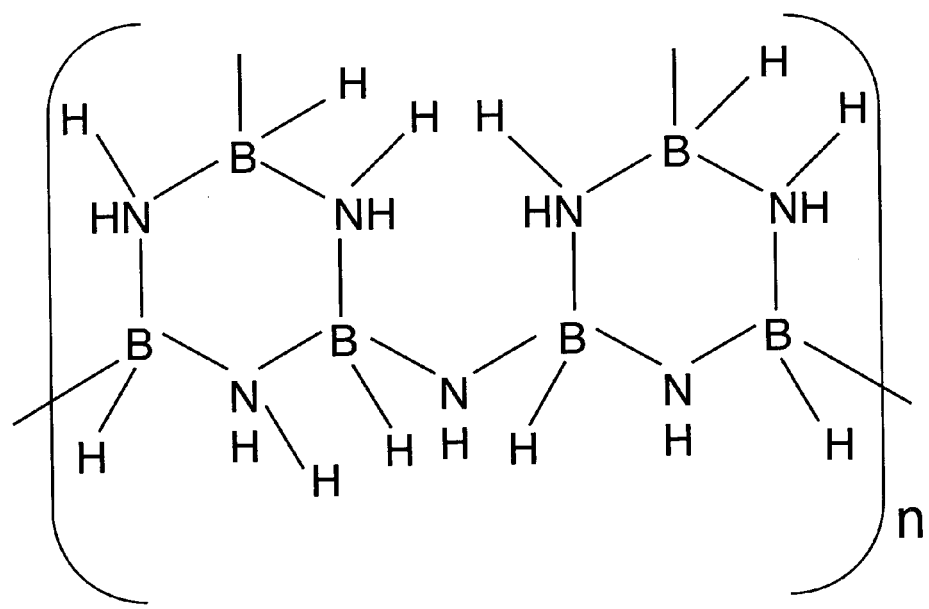
FIG. 2b is a schematic molecular diagram of a borazane polymer.

The borazane-borazine system includes borazine polymers because they can also be subjected to hydrochlorination and reduction for hydrogen storage because the reaction chemistry will occur on the borazine rings. A simple borazine polymer, shown in FIG. 2a, can be synthesized directly from B-trichloroborazine and hexamethyldisilazane. FIG. 2b shows the borazane polymer produced upon hydrogenation. Such borazane polymer will contain ~12.9 wt. % hydrogen and will release ~6 wt. % hydrogen during low temperature dehydrogenation.

Figure 3C:
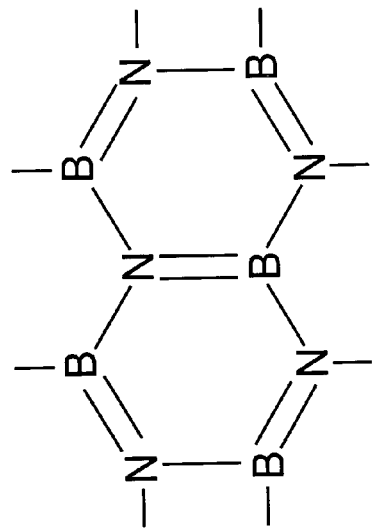
FIG. 3c is a schematic molecular diagram naphthalene borazine analogue.
Figure 3B:
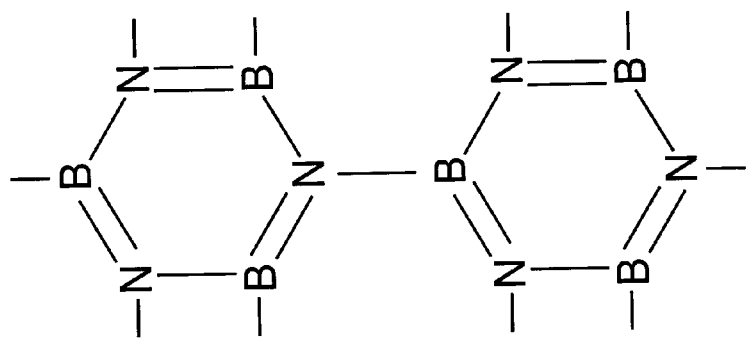
FIG. 3b is a schematic molecular diagram biphenyl borazine analogue.
Figure 3A:
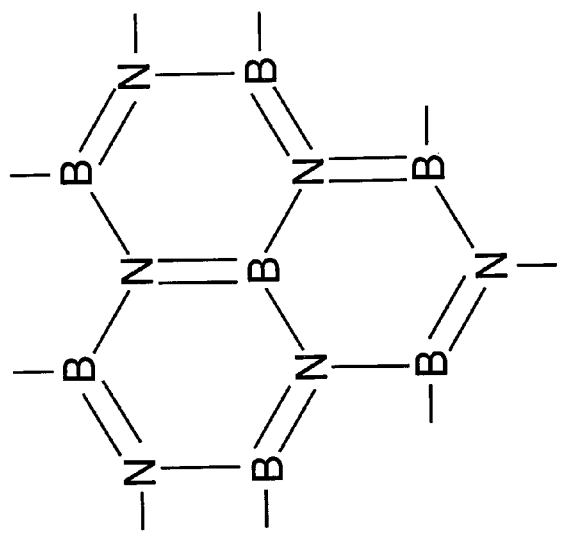
FIG. 3a is a schematic molecular diagram phenalene borazine analogue.

Referring respectively to FIGS. 3a, 3b, and 3c, variety of complex polymeric borazine analogues are suitable for use in hydrogenation-dehydrogenation cycles, including, but not limited to phenalene, biphenyl, and naphthalene analogues. Complex polymeric borazane-borazine systems impregnated on high-surface area BN can alleviate potential gas-separation issues that may be present in simple borazane/BN composites. Furthermore, the polymeric systems are solids in both hydrogenated (borazane) and dehydrogenated (borazine) form and do not have any inherent problems associated with the use of volatile liquids for hydrogen storage.

Unlike boranes, explored as rocket fuels in the 1960s, the boron nitrogen compounds of borazane type are stable under ambient conditions in the absence of moisture. Trimethylborazanes used in the testing of the present invention had been stored in screw cap bottles for approximately 20 years.

In accordance with the present invention, borazane-impregnated BN is viable hydrogen storage system. Moreover, high-surface-area BN is used as a borazane carrier as well as a borazine adsorber. The polymeric chemical hydride system overcomes the inherent problems associated with the use of volatile liquids for hydrogen storage. Moreover, the chemical hydride component can be hydrogenated by chemical reactions routes such as, but not limited to, hydrochlorination and reduction. Hydrogenation and dehydrogenation can be facilitated at low temperatures by use of a catalyst system.

This system retains most of the hydrogen storage capacity (~6.0%), but the primary advantage thereof is that media remain in solid state through hydrogenation-dehydrogenation cycle. This eliminates the need to separate hydrogen from volatile dehydrogenated borazane (i.e., borazine).

EXAMPLE I

A mixture of two isomers, 1(e),3(e),5(e)-trimethylcycloborazane and 1(e),3(e),5(a)-trimethylcycloborazane was prepared.

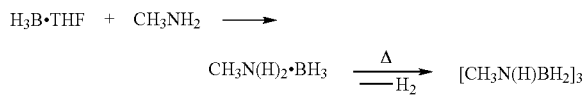

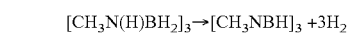

The decomposition temperature of trimethylcycloborazane was determined to be 250° C. at atmospheric pressure.

$[CH_3N(H)BH_2]_3 \rightarrow [CH_3NBH]_3 + 3H_2$

The model compound released 4.49% $H_2$ at 80° C. and additional 4.7% $H_2$ at 260° C. (w/w≈v/v since density is ~1). The model compound was dissolved in organic solvents (such as, but not limited to, benzene, tetrahydrofuran etc.) and impregnated into high-surface-area BN.

Although any BN particulates can be used, high-surface-area BN is preferred for use in carrying out the present invention because the available surface area is directly proportional to the amount of borazane and/or borazine that can be loaded (sorbed) thereon. Although lesser loadings are operable in carrying out the present invention, the preferred loading of borazane and/or borazine is the maximum amount of borazane and/or borazine that can be loaded onto the BN, i.e. saturation.

EXAMPLE II

Spherical, high-surface-area BN particles were prepared in two steps in accordance with U.S. Pat. No. 6,348,179 issued on Feb. 19, 2002 to Paine, et al. In the first step, a conventional aerosol reactor was used with commercially available trialkylborate compounds and ammonia to form $BN_xO_y$ spherical particles with oxygen levels less than 8 wt %. Brief calcination of the particles in $NH_3$ gave smooth spherical morphology particles of BN.

In some embodiments of the present invention, at least one catalyst can be added in an amount in the range of about 0.05 wt % to about 1%, preferably about 0.5% to about 0.8%. Too little catalyst can be ineffective, and too much catalyst would not be cost-effective.

Catalytic dehydrogenation reduces the temperature of dehydrogenation and the complexity associated with chemical hydrogenation protocol. The catalyzed dehydrogenative coupling of >B—H bond with >N—H bond (see U.S. Pat. No. 4,801,439 to Blum, et al.) can be adapted for dehydrogenation of —[$H_2B$-—$NH_2$]— bonds.

Several homogenous and heterogeneous catalysts are suitable for dehydrogenative coupling of aminoboranes with amines. One of the examples describes dehydrogenative coupling of borane-ammonia complex using $Ru_3(CO)_{12}$ at 60° C. (cf. 130-150° C. without catalyst).

The catalyzed hydrogenation of boron nitrogen compounds containing tri-coordinate boron (a typical first step product from dehydrogenation of boron nitrogen compounds containing tetra-coordinate boron) can also be carried out. Since the >B-N< bond is isostructural and isoelectronic with the >C=C< bond, the starting point for catalytic hydrogenation points to the use of hydrogenation catalysts used in the past for alkenes and arenas such as, for example, $RhCl(PPh_3)_3$ (Wilkinson's catalyst), $Ir(CO)ClL_2$, $IrClL_{2-3}$, $HRuClL_3$, $Rh(BH_4)(Cl)_2(DMF)(Py_2)$, $RuCl(H)(CO)L_3$, RhH(DBP)$_3$, PtH(SnCl$_3$)(PPh$_3$)$_2$, [Rh(Phen)(1,5-hexadiene]$^+$, [Ir$^+$(COD)L$_2$]ClO$_4^-$, and [Ir$^+$(COD)(PCy$_3$)(Py)]PF$_6^-$.

Figure 4:
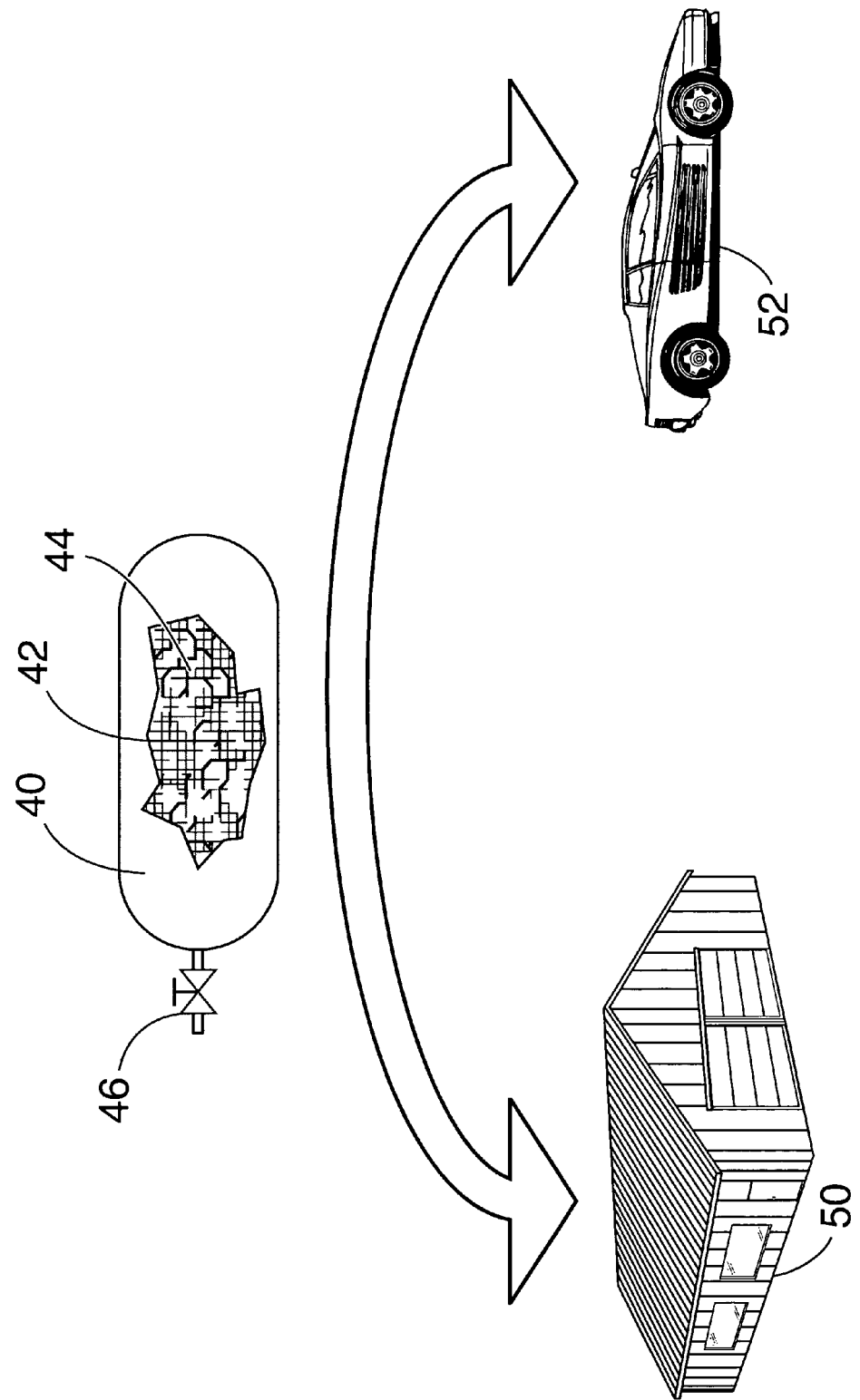
FIG. 4 is a schematic, not-to-scale illustration of an embodiment of the invention that involves a detachable cartridge containing the composite materials of the present invention.

In a hydrogen storage system, the compositions of the present invention can be encapsulated in a containment vessel for storing hydrogen. A versatile embodiment of the invention is shown in FIG. 4. A detachable cartridge 40 containing the composite materials of the present invention 44 (viewed through cutaway 42) that can be integrated into fuel systems. A spent cartridge 40 can be replaced and/or refueled at a refueling station 50 by means of a valve 46 or other conventional means. A fresh cartridge 40 is mounted in a vehicle 52 where the hydrogen is used to power the vehicle 52 in accordance with the present invention. Spent cartridges can alternatively be taken to a central facility for recharging (hydrogenation) in accordance with the present invention.

The U.S. Department of Energy, Office of Hydrogen, Fuel Cells, and Infrastructure and Office of FreedomCAR and Vehicle Technologies have embarked on a Presidential Initiative to develop a hydrogen-powered fuel cell automobile. The goals of the program include very high energy efficiency and nearly zero harmful emissions. If the hydrogen is produced from non-petroleum feedstock, the program offers the potential of increased national security via less dependency on imported oil. While there are many technological barriers in this program, there is consensus that solid-state storage of hydrogen at high densities (e.g., ~10% by weight of the fuel storage system) is the critical barrier. Although extensive literature indicates many materials, systems, and approaches have been examined, there is no clearly defined path to reaching the DOE hydrogen storage goals. It is important to mention that the present invention can provide up to 9.2% H$_2$ (excluding the weight of system for on-board installation).

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A hybrid hydrogen storage composition comprising a first phase and a second phase adsorbed on said first phase, said first phase comprising BN for storing hydrogen by physisorption and said second phase comprising a borazane-borazine system for storing hydrogen in combined form as a hydride.

2. A hybrid hydrogen storage composition in accordance with claim 1 wherein said first phase is saturated with said second phase.

3. A hybrid hydrogen storage composition in accordance with claim 1 wherein said borazane-borazine system comprises a polymeric structure.

4. A hybrid hydrogen storage composition in accordance with claim 1 wherein said second phase further comprises a catalyst for enhanced dehydrogenation of said second phase.

5. A hybrid hydrogen storage composition in accordance with claim 4 wherein said catalyst comprises at least one catalyst selected from the group consisting of RhCl(PPh$_3$)$_3$, Ir(CO)ClL$_2$, IrClL$_{2-3}$, HRuClL$_3$, Rh(BH$_4$)(Cl)$_2$(DMF)(Py$_2$), RuCl(H)(CO)L$_3$, RhH(DBP)$_3$, PtH(SnCl$_3$)(PPh$_3$)$_2$, [Rh(Phen)(1,5-hexadiene]$^+$, [Ir$^+$(COD)L$_2$]ClO$_4^-$, and [Ir$^+$(COD)(PCy$_3$)(Py)]PF$_6^-$.

6. A hydrogen storage system comprising a containment vessel containing a hybrid hydrogen storage composition comprising a first phase and a second phase adsorbed on said first phase, said first phase comprising BN for storing hydrogen by physisorption and said second phase comprising a borazane-borazine system for storing hydrogen in combined form as a hydride.

7. A hydrogen storage system in accordance with claim 6 wherein said containment vessel comprises a removable cartridge.

8. A hybrid hydrogen storage system in accordance with claim 6 wherein said first phase is saturated with said second phase.

9. A hybrid hydrogen storage system in accordance with claim 6 wherein said borazane-borazine system comprises a polymeric structure.

10. A hybrid hydrogen storage system in accordance with claim 6 wherein said second phase further comprises a catalyst for enhanced dehydrogenation of said second phase.

11. A hybrid hydrogen storage system in accordance with claim 10 wherein said catalyst comprises at least one catalyst selected from the group consisting of RhCl(PPh$_3$)$_3$, Ir(CO)ClL$_2$, IrClL$_{2-3}$, HRuClL$_3$, Rh(BH$_4$)(Cl)$_2$(DMF)(Py$_2$), RuCl(H)(CO)L$_3$, RhH(DBP)$_3$, PtH(SnCl$_3$)(PPh$_3$)$_2$, [Rh(Phen)(1,5-hexadiene]$^+$, [Ir$^+$(COD)L$_2$]ClO$_4^-$, and [Ir$^+$(COD)(PCy$_3$)(Py)]PF$_6^-$.

* * * * *